United States Patent
Einaudi et al.

(10) Patent No.: US 12,052,323 B2
(45) Date of Patent: *Jul. 30, 2024

(54) AUTOMATIC SWITCHING DEVICE OPERATION DETERMINATION BASED ON RECEIVED NOTIFICATIONS

(71) Applicant: Caavo Inc, Milpitas, CA (US)

(72) Inventors: Andrew E. Einaudi, Scotts Valley, CA (US); Ashish D. Aggarwal, Stevenson Ranch, CA (US)

(73) Assignee: Caavo Inc, Milpitas, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 17/865,821

(22) Filed: Jul. 15, 2022

(65) Prior Publication Data

US 2022/0353347 A1 Nov. 3, 2022

Related U.S. Application Data

(63) Continuation of application No. 17/520,964, filed on Nov. 8, 2021, which is a continuation of application
(Continued)

(51) Int. Cl.
*H04L 67/55* (2022.01)
*G06F 16/783* (2019.01)
(Continued)

(52) U.S. Cl.
CPC .......... *H04L 67/55* (2022.05); *G06F 16/7837* (2019.01); *G06F 16/9538* (2019.01);
(Continued)

(58) Field of Classification Search
CPC ......... H04L 67/55; H04L 49/20; H04L 65/60; H04L 67/141; H04L 51/02;
(Continued)

(56) References Cited

U.S. PATENT DOCUMENTS 9,554,061 B1 1/2017 Proctor, Jr. et al.
11,190,606 B2 11/2021 Einaudi et al.
(Continued)

*Primary Examiner* — Vinncelas Louis
(74) *Attorney, Agent, or Firm* — Sterne, Kessler, Goldstein & Fox P.L.L.C.

(57) ABSTRACT

A switching device is enabled to automatically perform one or more actions based on one or more notifications received thereby. A notification may be received by a device communicatively coupled to the switching device, or alternatively, may be internally-generated. Upon receiving the notification, the switching device utilizes a notification-to-action mapping to determine which action(s) are to be performed based on the notification received. The action(s) include automatically switching the switching device to a device coupled to a port thereof and/or automatically launching an application executing on that device in order to view the notification and/or content associated with the notification. In other example, the action(s) may include sending the notification to another device, such as a user's mobile phone and/or causing an application executing on the mobile phone to be launched in order to view the notification and/or content associated with the notification.

20 Claims, 8 Drawing Sheets

Related U.S. Application Data

No. 16/536,737, filed on Aug. 9, 2019, now Pat. No. 11,190,606.

(60) Provisional application No. 62/716,585, filed on Aug. 9, 2018.

(51) Int. Cl.
*G06F 16/9538* (2019.01)
*H04L 49/20* (2022.01)
*H04L 65/60* (2022.01)
*H04L 67/141* (2022.01)
*H04N 21/44* (2011.01)

(52) U.S. Cl.
CPC .............. *H04L 49/20* (2013.01); *H04L 65/60* (2013.01); *H04L 67/141* (2013.01); *H04N 21/44008* (2013.01)

(58) Field of Classification Search
CPC ............ G06F 16/7837; G06F 16/9538; H04N 21/44008; H04N 21/4131; H04N 21/44227; H04N 21/4622; H04N 21/485; H04N 21/43615; H04N 21/42204; H04N 21/42203; G09G 5/006
See application file for complete search history.

(56) References Cited

U.S. PATENT DOCUMENTS

| | | | |
|---|---|---|---|
| 2010/0118193 A1* | 5/2010 | Boyden | G09G 5/006 348/554 |
| 2012/0278329 A1 | 11/2012 | Borggaard et al. | |
| 2013/0076989 A1 | 3/2013 | Barnett et al. | |
| 2014/0259032 A1 | 9/2014 | Zimmerman | |
| 2015/0121363 A1 | 4/2015 | Quintana et al. | |
| 2015/0350031 A1 | 12/2015 | Burks et al. | |
| 2015/0350147 A1* | 12/2015 | Shepherd | H04L 51/02 715/752 |
| 2016/0142648 A1* | 5/2016 | Gopinath | H04N 21/42204 348/705 |
| 2017/0041388 A1 | 2/2017 | Tal et al. | |
| 2018/0278999 A1* | 9/2018 | David | H04N 21/42203 |
| 2018/0348718 A1 | 12/2018 | Richardson et al. | |
| 2019/0286906 A1 | 9/2019 | Bivens et al. | |
| 2020/0053180 A1 | 2/2020 | Einaudi et al. | |
| 2022/0060553 A1 | 2/2022 | Einaudi et al. | |

* cited by examiner

| Notification | Action(s) |
|---|---|
| Notification 1 | Action 1 |
| Notification 2 | Action 2; Action 3 |
| Notification 3 | Action 4; Action 5; Action 6 |
| ⋮ | ⋮ |
| Notification N | Action(s) N |

AUTOMATIC SWITCHING DEVICE OPERATION DETERMINATION BASED ON RECEIVED NOTIFICATIONS

CROSS-REFERENCE TO RELATED APPLICATIONS

This application is a continuation of U.S. application Ser. No. 17/520,964, filed Nov. 8, 2021, which is a continuation of U.S. application Ser. No. 16/536,737, issued, filed Aug. 9, 2019, which claims priority to U.S. Provisional Patent Application Ser. No. 62/716,585, filed Aug. 9, 2018, the entireties of which are incorporated by reference herein.

BACKGROUND

Technical Field

The present invention relates to methods, systems, and apparatuses for automatic operation determination for a switching device.

Background Art

The number of ways people consume media and other content continues to increase. Not only are people consuming content via live television, but also via Internet streaming applications and devices, social media, Internet news feeds, etc. Accordingly, managing information from these ever-increasing number of sources is becoming unmanageable. Often, a user has to juggle between multiple applications and/or devices in order to find the content they want to consume. This problem is compounded by the rise of smart home devices (e.g., Internet-of-Things devices), which provide a variety of different notifications and alerts to the user.

BRIEF SUMMARY

Methods, systems, and apparatuses are described for the automatic operation determination for a switching device, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 3 depicts a data structure that stores a notification-to-action mapping in accordance with an example embodiment.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Introduction

Figure 1:
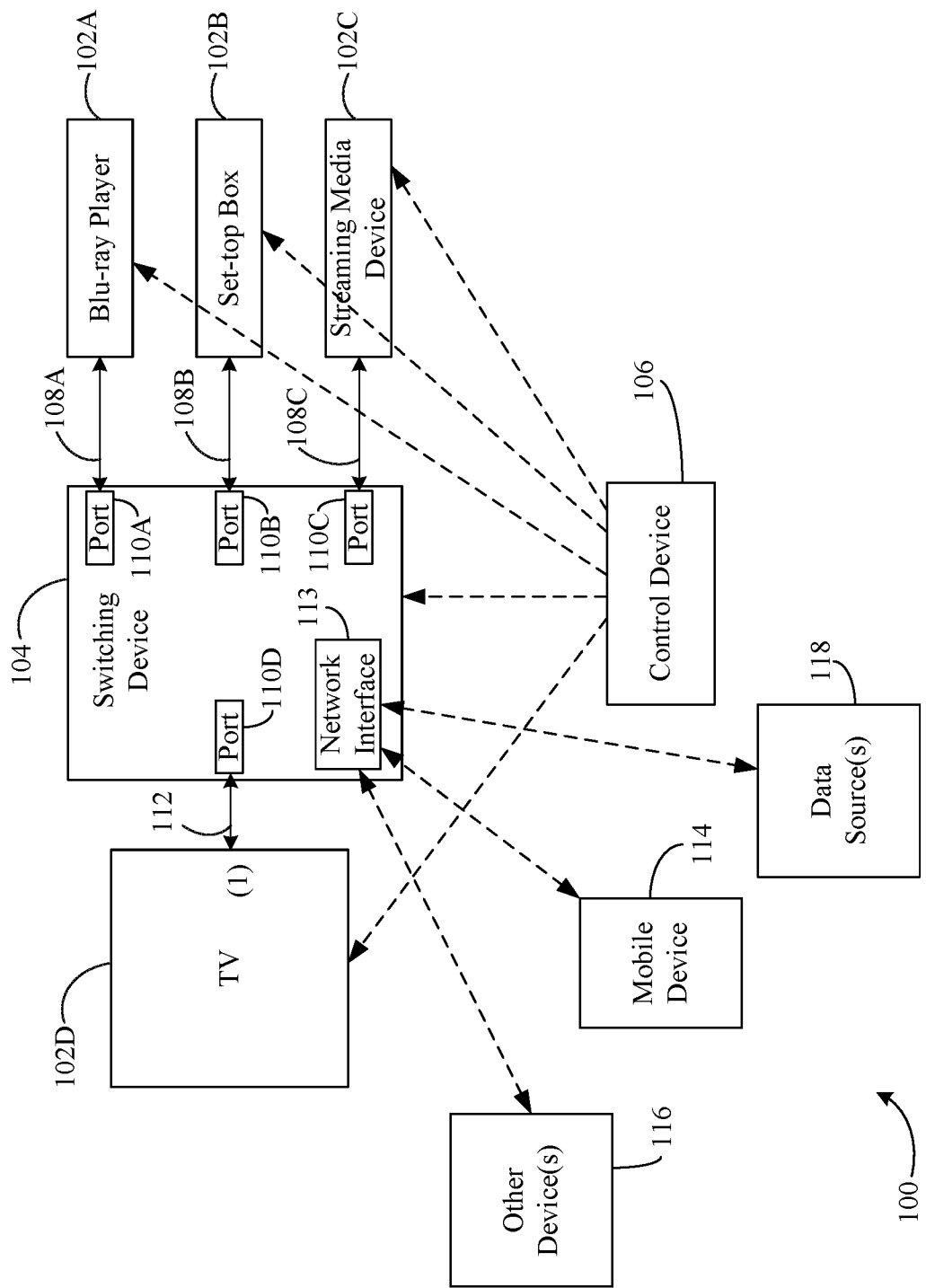
FIG. 1 is a block diagram of a system that is configured to automatically determine operation(s) that are to be performed by a switching device in accordance with an example embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," "front," "rear," etc.) used herein are for purposes of illustration only, and that practical implementations of the structures described herein can be spatially arranged in any orientation or manner.

Numerous exemplary embodiments are described as follows. It is noted that the section/subsection headings used herein are not intended to be limiting. Embodiments described in this document may be eligible for inclusion within multiple different sections or subsections. Furthermore, disclosed embodiments may be combined with each other in any manner. Example systems, apparatuses, and methods are described as follows.

For instance, in one embodiment, a method is performed by a switching device. The switching device comprises a plurality of audio/video (AV) ports and a switch circuit that is operable to selectively connect any one of a plurality of source devices, each of which is connected to a corresponding one of the AV ports, to a sink device that is connected to another one of the AV ports. The method includes processing at least one of a notification received via a network interface of the switching device or a notification generated by the switching device, determining one or more actions to be performed by the switching device in response to receiving the notification using a notification-to-action mapping that maps a plurality of different one or more notifications to a plurality of different one or more actions, and performing the one or more actions.

In accordance with one or more embodiments, the notification is received via one or more data sources configured to provide one or more of news-related information, sports-related information, weather-related information, social-media related information, or information associated with one or more accounts associated with a user of the switching device.

In accordance with one or more embodiments, the notification indicates that a particular object has been detected in a video stream being provided to the sink device.

In accordance with one or more embodiments, the method further comprises generating a search query based on the particular object indicated by the notification, causing the search query to be submitted to a search engine, and causing search results received based on the search query to be displayed via the sink device.

In accordance with one or more embodiments, the notification is received from one or more devices communicatively coupled to the switching device, the one or more devices comprising at least one of, a mobile device, a smart appliance, an Internet-of-Things device, a router, or a gateway.

In accordance with one or more embodiments, the one or more actions comprise launching an application on the switching device, causing an application on a mobile device communicatively coupled to the switching device via the network interface to be launched, causing the notification to be displayed on the sink device, causing the notification to be displayed on the mobile device, causing a search query to be performed, switching to a port of the plurality of AV ports to which a source device of the plurality of source devices that is configured to perform at least one of the one or more actions is coupled, or causing a source device of the plurality of source device to playback content.

In accordance with one or more embodiment, said performing comprises providing a prompt to the sink device to be displayed thereby, the prompt prompting a user to indicating whether the one or more actions are to be performed, and performing the one or more actions responsive to receiving input from the user that is indicative that the one or more actions are to be performed.

A switching device is also described herein. The switching device includes a plurality of AV ports, a network interface, and a switch circuit that is operable to selectively connect any one of a plurality of source devices, each of which is connected to a corresponding one of the plurality of AV ports, to a sink device that is connected to another one of the plurality of AV ports. The switching device is configured to process at least one of a notification received via the network interface or a notification generated by the switching device, determine one or more actions to be performed by the switching device in response to receiving the notification using a notification-to-action mapping that maps a plurality of different one or more notifications to a plurality of different one or more actions, and perform the one or more actions.

In accordance with one or more embodiments, the notification is received via one or more data sources configured to provide one or more of news-related information, sports-related information, weather-related information, social-media related information, or information associated with one or more accounts associated with a user of the switching device.

In accordance with one or more embodiments, the notification indicates that a particular object has been detected in a video stream being provided to the sink device.

In accordance with one or more embodiments, the switching device is further configured to generate a search query based on the particular object indicated by the notification, cause the search query to be submitted to a search engine, and cause search results received based on the search query to be displayed via the sink device.

In accordance with one or more embodiments, the notification is received from one or more devices communicatively coupled to the switching device, the one or more devices comprising, a mobile device, a smart appliance, an Internet-of-Things device, a router, or a gateway.

In accordance with one or more embodiments, the one or more actions comprise launching an application on the switching device, causing an application on a mobile device communicatively coupled to the switching device via the network interface to be launched, causing the notification to be displayed on the sink device, causing the notification to be displayed on the mobile device, causing a search query to be performed, switching to a port of the plurality of AV ports to which a source device of the plurality of source devices that is configured to perform at least one of the one or more actions is coupled, or causing a source device of the plurality of source device to playback content.

In accordance with one or more embodiment, the switching device is configured to perform the one or more actions by providing a prompt to the sink device to be displayed thereby, the prompt prompting a user to indicating whether the one or more actions are to be performed, and performing the one or more actions responsive to receiving input from the user that is indicative that the one or more actions are to be performed.

A system is further described herein. The system includes one or more processors and a memory containing computer-readable instructions, which, when executed by the one or more processors, is configured to perform operations in a switching device comprising a plurality of AV ports and a switch circuit that is operable to connect any one of a plurality of source devices, each of which is connected to a corresponding one of the plurality of AV ports, to a sink device that is connected to another one of the plurality of AV ports. The operations comprise processing at least one of a notification received via a network interface of the switching device or a notification generated by the switching device, determining one or more actions to be performed by the switching device in response to receiving the notification using a notification-to-action mapping that maps a plurality of different one or more notifications to a plurality of different one or more actions, and performing the one or more actions.

In accordance with one or more embodiments, the notification is received via one or more data sources configured to provide one or more of news-related information, sports-related information, weather-related information, social-media related information, or information associated with one or more accounts associated with a user of the switching device.

In accordance with one or more embodiments, the notification indicates that a particular object has been detected in a video stream being provided to the sink device.

In accordance with one or more embodiments, the operation further comprises generating a search query based on the particular object indicated by the notification, causing the search query to be submitted to a search engine, and causing search results received based on the search query to be displayed via the sink device.

In accordance with one or more embodiments, the notification is received from one or more devices communicatively coupled to the switching device, the one or more devices comprising, a mobile device, a smart appliance, an Internet-of-Things device, a router, or a gateway.

In accordance with one or more embodiments, the one or more actions comprise launching an application on the switching device, causing an application on a mobile device communicatively coupled to the switching device via the network interface to be launched, causing the notification to be displayed on the sink device, causing the notification to be displayed on the mobile device, causing a search query to be performed, switching to a port of the plurality of AV ports to which a source device of the plurality of source devices that is configured to perform at least one of the one or more actions is coupled, or causing a source device of the plurality of source device to playback content.

These and further embodiments are described in even greater detail in the following section.

Example Embodiments

Embodiments described herein enable a switching device to automatically perform one or more actions based on one or more notifications received thereby. A notification may be received by a device communicatively coupled to the switching device, or alternatively, may be internally-generated. In response to receiving the notification, the switching device utilizes a notification-to-action map to determine which action(s) are to be performed based on the notification received. The action(s) include automatically switching the switching device to a device coupled to a port thereof and/or automatically launching an application executing on that device in order to view the notification and/or content associated with the notification. In another example, the action(s) may include sending the notification to another device, such as a user's mobile phone and/or causing an application executing on the mobile phone to be launched in order to view the notification and/or content associated with the notification.

Such embodiments may be configured in various ways. For instance, FIG. 1 is a block diagram of a system 100 that is configured to automatically determine operations(s) (or action(s)) that are to be performed by a switching device 104 in accordance with an example embodiment. As shown in FIG. 1, system 100 includes electronic devices 102A-102D, switching device 104, a control device 106, a mobile device 114, one or more other devices 116, and one or more data source(s) 118. System 100 is described in detail as follows.

Electronic devices 102A-102C are configured to provide audio and/or video signals (e.g., audio and/or video signals 108A, 108B, 108C, respectively) for playback and are referred to as "source" devices. Electronic device 102D is configured to receive audio and/or video signals (e.g., audio and/or video signals 112) and is referred to as a "sink" device. As shown in FIG. 1, electronic device 102A is coupled to a first AV port 110A of switching device 104, electronic device 102B is coupled to a second AV port 110B of switching device 104, electronic device 102C is coupled to a third AV port 110C of switching device 104, and electronic device 102D is coupled to a fourth AV port 110D of switching device 104. In accordance with an embodiment, AV ports 110A-110D are High Definition Media Interface (HDMI) ports. However, embodiments described herein are not so limited, and other types of ports and communication protocols may be used. As further shown in FIG. 1, electronic device 102A is a Blu-ray player, electronic device 102B is a set-top box, electronic device 102C is a streaming media device, and electronic device 102D is a TV. Examples of a streaming media device include, but are not limited to, a Roku™ device, an AppleTV™ device, a Google Chromecast™, and/or the like. The depiction of these particular electronics devices is merely for illustrative purposes. It is noted that while FIG. 1 shows that switching device 104 includes four AV ports 110A-110D, switching device 104 may include any number of AV ports, and therefore, may be coupled to any number of electronic devices.

Switching device 104 is configured to select (e.g., switch between) different audio and/or video source devices that are coupled to AV ports 110A-110C (e.g., electronic device 102A, electronic device 102B or electronic device 102C) and provide an output signal (e.g., audio and/or video signals 112) comprising audio and/or video signals (e.g., audio and/or video signals 108A, audio and/or video signals 108B or audio and/or video signals 108C) provided by the selected audio/video source to electronic device 102D. Audio and/or video signals 112 may also be provided to any other device capable of playing back audio and/or video signals (e.g., speakers) that may be coupled to AV port 102D and/or other port(s) (not shown) of switching device 104.

Each of AV ports 110A-110D may be configurable to be coupled to either a source device (e.g., electronic device 102A, electronic device 102B, or electronic device 102C) or a sink device (e.g., electronic device 102D). For example, switching device 104 may be configured to automatically determine whether an electronic device coupled to a particular AV port is a source device or a sink device. Based on that determination, switching device 104 may configure that AV port to be a source AV port or a sink AV port.

Switching device 104 may also be configured to automatically identify (e.g., determine) the electronic device coupled to each of AV ports 110A-110D. For example, for each electronic device coupled to a particular AV port, switching device 104 may be configured to determine one or more identifiers of the electronic device, such as, but not limited to, a type of the electronic device (e.g., a DVD player, a Blu-ray player, a video game console, a streaming media device, a TV, an HDTV, a projector, etc.), a brand name of the electronic device, a manufacturer of the electronic device, a model number of the electronic device, etc. The identifier(s) may be determined according to various techniques, such as, but not limited to: techniques based on HDMI consumer electronics control (CEC), identification via video data, identification via audio data, identification via IP network, remote control operation by a user, voice input from a user, and explicit device selection by a user. Upon determining the identifier(s), switching device 104 may be configured to map the identified electronic device to the AV port to which that electronic device is connected. This process may be referred to as "device-to-port mapping".

As further shown in FIG. 1, switching device 104 may also comprise a network interface 113. Network interface 113 may be configured to communicatively couple mobile device 114, data source(s) 118, and/or other device(s) 116 to switching device 104 via a network. For example, network interface 113 may be configured transmit and/or receive signals to and/or from mobile device 114, data source(s) 118, and/or other device(s) 116 in accordance with Bluetooth™, as described in the various standards developed and licensed by the Bluetooth™ Special Interest Group, technologies such as ZigBee® that are based on the IEEE 802.15.4 standard for wireless personal area networks, internet protocol (IP)-based communication technologies such as any of the well-known IEEE 802.11 protocols, etc., and/or the like.

Examples of mobile device 114 include, but are not limited to, a tablet device, a smart phone, a laptop computer, a personal data assistant, etc. Examples of other device(s) 116 include, but are not limited to, a personal computer, an Internet-of-Things (IoT) device (e.g., a smart thermostat, a video camera, a smart door bell, smart locking devices, a motion sensor, smart light bulbs, etc.), a smart appliance (e.g., a washer, dryer, refrigerator, etc.), a router, an access point, a network gateway, etc.

Data source(s) 108 may be implemented via a server or distributed server environment (e.g., one or more networked server(s) or "in the cloud") that store and/or provide various information that may be retrieved from and/or provided to switching device 104. The information includes, but is not limited to, real-time information (e.g., traffic-related information, weather-related information, news-related information, sporting-event related information), electronic programming guide-related information, location-based information, etc. The information may also include social media-related information (e.g., notification(s) associated with one or more social media accounts associated with user(s) of switching device 104 (for example, status updates, tweets, posts of social media contacts connected to the user(s) of switching device 103)). The information may also include information associated with other accounts and/or service(s) associated with the user (e.g., bank accounts, ridesharing service accounts, etc.). Data source(s) 108 may be accessible via a network (e.g., in a "cloud-based" embodiment) coupled to network interface 113. The network may comprise one or more networks such as local area networks (LANs), wide area networks (WANs), enterprise networks, the Internet, etc., and may include one or more of wired and/or wireless portions.

In an embodiment, data source(s) 118 may be co-located (e.g., housed in one or more nearby buildings with associated components such as backup power supplies, redundant data communications, environmental controls, etc.) to form a datacenter, or may be arranged in other manners. Accordingly, in an embodiment, one or more of data source(s) 118 may be a datacenter in a distributed collection of datacenters.

In embodiments, switching device 104 is configured to automatically perform one or more actions upon receiving a notification, via network interface 113, from one or more of mobile device 114, other device(s) 116, control device 106, data source(s) 118, and/or electronic device(s) 102A-102D. Switching device 104 may be further configured to automatically perform action(s) based on an internally-generated notification, which is based on a detection of a particular object or scene within a video stream being provided to and/or displayed by a display device (e.g., electronic device 102D). For instance, switching device 104 may utilize a notification-to-action mapping, which specifies the actions to be performed based on the notification received. Additional details regarding the foregoing techniques is described below with reference to FIGS. 2-8.

Control device 106 may be operable to control any or all of electronic devices 102A-102D and/or switching device 104. Control device 106 may include a display screen and/or one or more physical interface elements (e.g., buttons, sliders, jog shuttles, etc.). In accordance with an embodiment, the display screen (or a portion thereof) may be a capacitive touch display screen. The display screen may be configured to display one or more virtual interface elements (e.g., icons, buttons, search boxes, etc.). The display screen may be configured to enable a user to interact, view, search, and/or select content for viewing via any of electronic device 102A-102D and switching device 104.

In accordance with an embodiment, control device 106 may be operable to control any or all of electronic devices 102A-102D by transmitting control signals thereto. In accordance with an embodiment, the control signals are transmitted via a wired connection (e.g., via a Universal Serial Bus (USB) cable, a coaxial cable, etc.). In accordance with another embodiment, the control signals are transmitted via a wireless connection (e.g., via infrared (IR) communication, or radio frequency (RF) communication provided via network interface 113 (e.g., Bluetooth™, as described in the various standards developed and licensed by the Bluetooth™ Special Interest Group, technologies such as ZigBee® that are based on the IEEE 802.15.4 standard for wireless personal area networks, near field communication (NFC), other RF-based or internet protocol (IP)-based communication technologies such as any of the well-known IEEE 802.11 protocols, etc.) and/or the like).

In accordance with an embodiment, control device 106 is a mobile device (e.g., mobile device 114). In accordance with another embodiment, control device 106 is a dedicated remote control device including smart features such as those typically associated with a smart phone (e.g., the capability to access the Internet and/or execute variety of different software applications), but without the capability of communicating via a cellular network.

Figure 2:
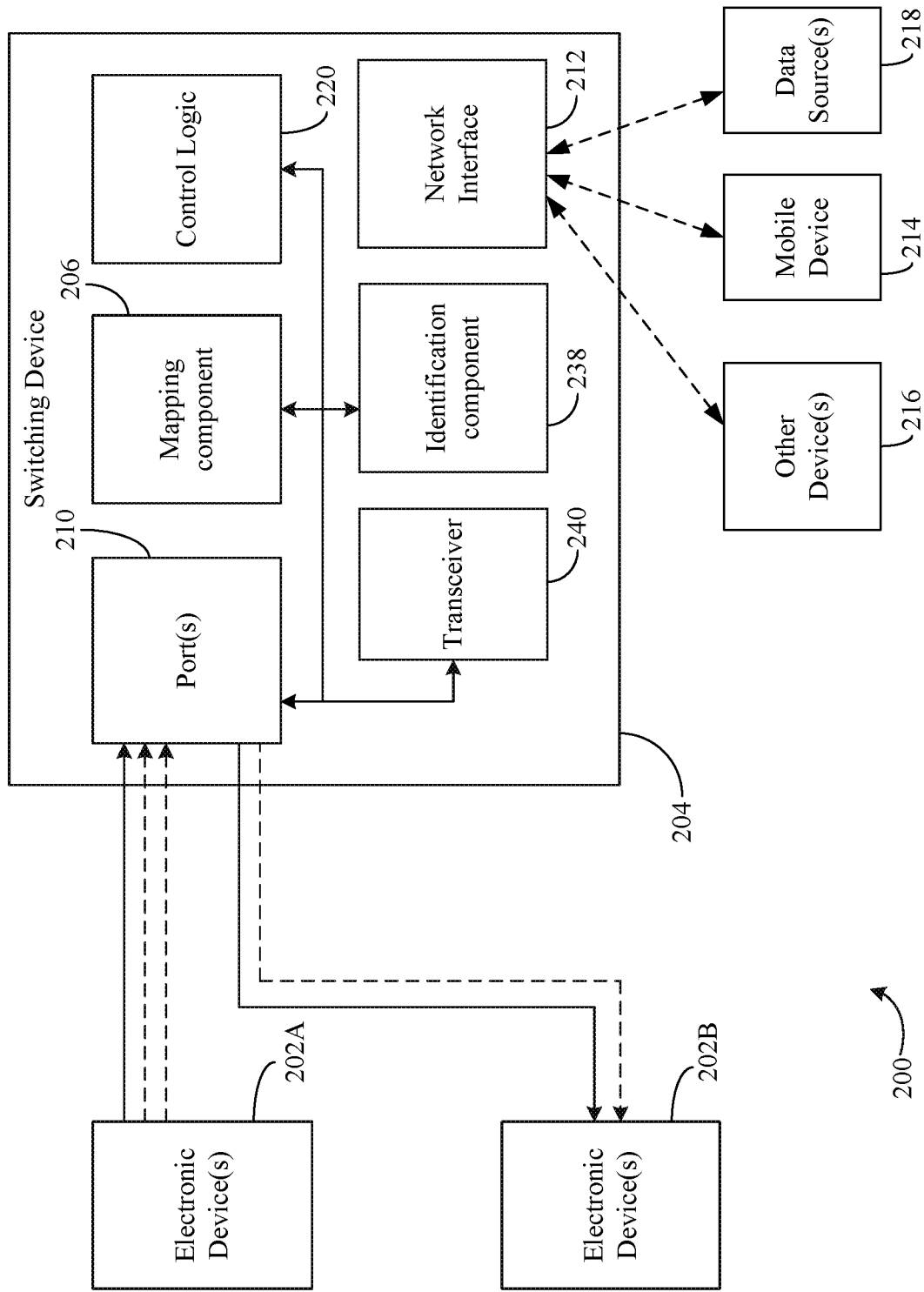
FIG. 2 is a block diagram of a system that is configured to automatically determine operation(s) that are to be performed by a switching device in accordance with another embodiment.

FIG. 2 is a block diagram of a system 200 for automatically determining an operation to be performed by a switching device 204 in accordance with another embodiment. As shown in FIG. 2, system 200 includes one or more electronic devices 202A, one or more electronic devices 202B, switching device 204, other device(s) 216, mobile device 214, and data source(s) 218. Electronic device(s) 202A are source devices configured to provide audio and/or video signals. Electronic device(s) 202B are sink devices configured to receive audio and/or video signals. Electronic device(s) 202A may be examples of electronic devices 202A-202C, and electronic device(s) 202B may be examples of electronic device 102D, as described above in reference to FIG. 1.

Switching device 204 may be an example of switching device 104, as described above in reference to FIG. 1. As shown in FIG. 2, switching device 204 includes AV port(s) 210, transceiver 240, mapping component 206, control logic 220, identification component 238 and a network interface 212. Network interface 212 is an example of network interface 113, as shown in FIG. 1. Each of electronic devices 202A and 202B are coupled to an AV port of AV port(s) 210.

Transceiver 204 may be configured to receive audio and/or video signals and to transmit audio and/or video signals. In other words, transceiver 240 provides received input audio and/or video signals from source devices as output audio and/or video signals to sink devices, in accordance with the embodiments herein.

Identification component 238 may be configured to identify the electronic device (e.g., electronic device(s) 202A or 202B) coupled to each AV port of AV port(s) 210. For example, for each electronic device(s) 202A or 202B, identification component 238 may be configured to determine identifier(s) of the electronic device, such as, but not limited to a type of the electronic device (e.g., a DVD player, a Blu-ray player, a video game console, a streaming media device, a TV, an HDTV, a projector, etc.), a brand name of the electronic device, a manufacturer of the electronic device, a model number of the electronic device, the capabilities thereof, etc. The identifier(s) may be determined according to various techniques, such as, but not limited to: techniques based on HDMI consumer electronics control (CEC), identification via video data, identification via audio data, identification via IP network, remote control operation by a user, voice input from a user, and explicit device selection by a user. Identification component 238 provides the identifier(s) to mapping component 206.

Identification component 238 may be further configured to analyze the video signals provided to and/or the video content played back via electronic device(s) 202B to determine one or more objects or scenes being displayed. For example, switching device 204 may comprise a camera that records the images and/or video stream being played back by electronic device(s). Identification component 238 may perform image recognition on the images and/or video stream in accordance with an image recognition algorithm to detect objects or scenes being displayed by electronic device(s) 202B. Alternatively, identification component 238 may process and/or analyze the video signals (e.g., perform image recognition techniques) provided by electronic device(s) 202A to detect objects or scenes displayed by electronic device(s) 202B. As will be described below, switching device 204 may be configured to perform an action upon detecting a particular object or scene.

Mapping component 206 is configured to determine a device-to-port mapping based on the device identifier(s) received from identification component 238. For example, mapping component 206 may receive or generate a first data structure (e.g., a map such as a table, array, etc.) that associates the device identifier(s) for any given identified electronic device to the AV port to which that electronic device is coupled. In this way, this device-to-port map may indicate that a first electronic device (e.g., a Blu-ray player) is coupled to a first AV port (e.g., AV Port 1), that a second electronic device (e.g., a set-top box) is coupled to a second AV port (e.g., AV Port 2), and that a third electronic device (e.g., a TV) is coupled to a third AV port (e.g., AV Port 3). Mapping component 206 may also associate any determined capabilities of such devices to the identifiers thereof.

Mapping component 206 is also configured to determine a notification-to-action mapping. For example, mapping component 206 may generate a second data structure (e.g., a map such as a table, array, etc.) that associates different notifications to different actions to be performed responsive of receiving such notifications. An example of a notification-to-action map is shown in FIG. 3. For example, FIG. 3 depicts a data structure 300 that stores a notification-to-action map in accordance with an example embodiment. While data structure 300 is depicted as a table, any suitable data structure may be used. As shown in FIG. 3, data structure 300 comprises a notification column 302 and an action column 304. Upon receiving a notification from one or more of mobile device 214, other device(s) 216, data source(s) 218, mapping component 206 may determine whether such a notification is stored in data structure 300. If the notification is found, mapping component 206 determines the corresponding action(s) to be performed. Switching device 204 may enable a user to associate actions to different notifications. For instance, switching device 204 may display a user interface (e.g., a graphical user interface) via electronic device(s) 202B that enables a user to designate any number of actions to any number of different notifications.

Figure 4:
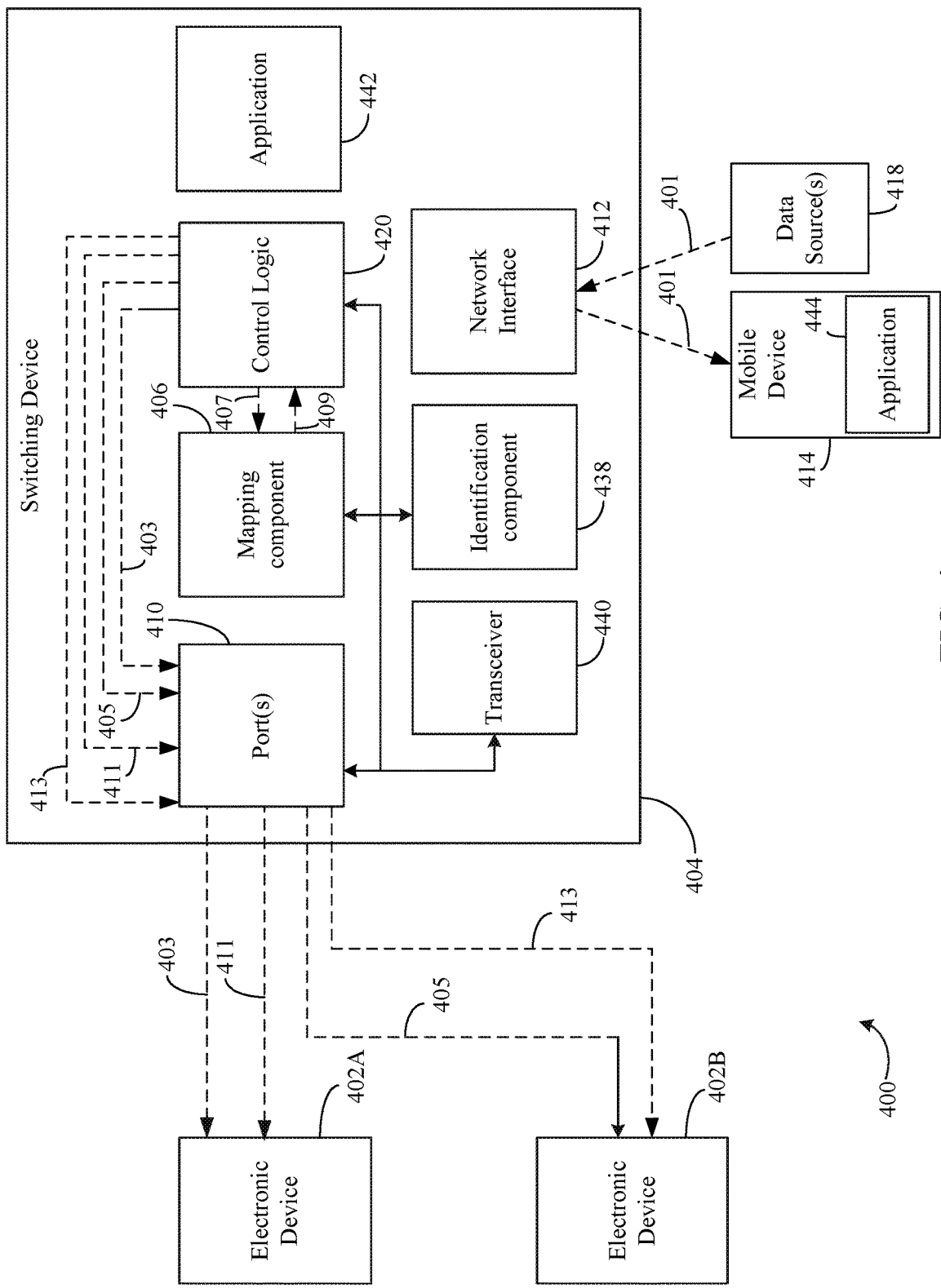
FIG. 4 is a block diagram of a system that is configured to automatically determine operation(s) that are to be performed by a switching device in accordance with a further embodiment.

FIG. 4 is a block diagram of a system 400 for automatically performing an action based on a notification received by a switching device 404 in accordance with another embodiment. As shown in FIG. 4, system 400 includes switching device 404, electronic device 402A, electronic device 402B, a mobile device 414, and data source(s) 418. System 400, switching device 404, mobile device 414, and data source(s) 418 are examples of system 200, switching device 204, mobile device 214, and data source(s) 218, as described above with reference to FIG. 2. Electronic device 402A is an example of electronic device(s) 202A, and electronic device 402B is an example of electronic device(s) 202B, as described above with reference to FIG. 2. Switching device 404 includes port(s) 410, mapping component 406, control logic 420, transceiver 440, identification component 438, and network interface 412. Port(s) 410, mapping component 406, control logic 420, transceiver 440, identification component 438, and network interface 412 are examples of port(s) 210, mapping component 206, control logic 220, transceiver 240, identification component 238, and network interface 212, as described above with reference to FIG. 2. As further shown in FIG. 4, switching device 404 may comprise a software application 442, and/or mobile device 414 may comprise a software application 444.

In accordance with FIG. 4, suppose switching device 404 receives a notification 401 from data source(s) 418 via network interface 412. Notification 401 may comprise a weather-related notification (e.g., "Severe Thunderstorm Warning"), a news-related notification (e.g., "Mars Landing Underway!"), a sports-related notification ("Game 7 of the World Series is about to start!", "Warriors down by three with one minute remaining!", etc.) from data source(s) 218, or other types of notifications (such as, but not limited to, an indication that a new movie or TV show on a content providing service has been released). Switching device 404 may receive such notifications by registering with data source(s) 418 that provide such services. A user, for example, during a setup/configuration process, may configure switching device 404 to receive notifications from such data source(s) 418. For instance, a user may provide, to switching device 404, credentials (e.g., a username, password, etc.) that the user uses to log in to such data source(s) 418. Switching device 404 utilizes such credentials to log into data source(s) 418, and data source(s) 418 provides notifications to switching device 404 accordingly.

Data structure 300 of mapping component 406 may specify that notification 401 (and/or contents thereof) is to be displayed via electronic device 402B, that notification 401 (and/or contents thereof) is to be forwarded to mobile device 414 via network interface 412 (which may cause notification 401 (and/or contents thereof) to be displayed via mobile device 414 or cause application 444 to be launched on mobile device 414), and/or launch application 442 stored by switching device 404. Application 444 executing on mobile device 414 and/or application 444 executing on switching device 404 may comprise a web browser application that traverses to an associated website (e.g., included in notification 401) upon receiving notification 401. Such websites include, but are not limited to, a weather-related website, a news-related website, a sports-related website, etc. Application 442 and/or application 444 may also be an associated application (e.g., a weather-related software application, a sports-related software application, a news-related software application) that launches upon receiving notification 401. Another action that may be specified by data structure 300 is automatically switching to an associated channel (e.g., a weather-related channel, a news-related channel, a sports-related channel (e.g., a news channel for sports, the channel on which a game identified in the notification is being broadcasted, etc.)). For instance, control logic 420 may determine an electronic device coupled to switching device 404 (e.g., electronic device 402A) that provides television programming (e.g., a cable set-top box, a satellite set-top box, etc.). For example, control device 420 provides a query 407 to mapping component 205 to search for devices coupled to switching device 404 that are capable of providing television programming (e.g., by searching for the stored capabilities), and mapping component 406 provides a response 409 specifying the port of port(s) 410 to which the determined device is coupled. Responsive to receiving response 409, control logic 420 automatically switches to specified port of port(s) 410. Control logic 420 may access the EPG of that determined electronic device to determine the channel number of the associated channel and send a control signal 403 to the determined electronic device (e.g., electronic device 402) that causes the electronic device to automatically tune/change to the determined channel number. Control signal 403 may be provided to electronic device 402A via the port of port(s) 410 to which the electronic device is coupled. For instance, control signal 403 may be HDMI-CEC-based control signal that identifies the channel. Alternatively, in an embodiment in which electronic device 402A is coupled to switching device 404 via network interface 412, control signal 403 may be provided to the electronic device via network interface 412. Accordingly, an action to be performed may be a multi-step action (e.g., 1) determine a device (e.g., electronic device 402A) that provides television programming; 2) automatically switch to the port or port(s) 410 to which that device is connected; 3) determine the channel number of an associated channel; and 4) send control signal 403 to electronic device 402A that causes device 402A to tune/change to the determined channel number). In the event that switching device 404 is already switched to the port of port(s) 410 to which the determined device is connected, the second step may be skipped. Before automatically switching ports, control logic 420 may provide a notification 405 to electronic device 402B for display thereby that prompts the user for input as to whether the user would like to watch an associated channel. Notification 405 may be provided to electronic device 402B via a port of port(s) 410 to which electronic device 402B is coupled and/or or via network interface 412. If the user provides a negative input, i.e., indicating that the user would not like to watch the associated channel, switching device 404 does not perform the port switching and/or channel changing operations. If the user provides a positive input, i.e., indicating that the user would like to watch the associated channel, switching device 404 performs the port switching and/or channel changing operations.

In another example, notification 401 may be a social media-related notification (e.g., "Bob J. just tweeted!"). Data structure 300 may specify that notification 401 is to be displayed via electronic device 402B, that notification 401 is to be forwarded to mobile device 414 (which may cause notification 401 to be displayed via mobile device 214 or cause application 444 to be launched on mobile device 414), and/or launch application 442 stored by switching device 404. Application 444 executing on mobile device 414 and/or application 442 executing on switching device 404 may comprise a web browser application that traverses to a social-media website upon receiving the notification, which is displayed via electronic device 402B. Alternatively, application 442 and/or 444 may be a social media-related software application (e.g., Twitter™, Facebook™, LinkedIn™, etc.) that launches upon receiving notification 401. Another action that may be specified by data structure 300 is automatically playing certain content (e.g., a TV show, a movie, etc.). For example, notification 401 may specify that the user's friend is watching certain content ("Mike W. is watching Game of Thrones"). In accordance with such an example, control logic 420 may determine an electronic device coupled to switching device 404 (e.g., electronic device 402A) that provides a content providing service (e.g., an Internet streaming service, such as, HBO Go™, Hulu™ Netflix™, etc.), a particular channel provided via a cable set-top box or a satellite set-top box, etc. that provides such content, etc. using mapping component 406 as described above. For example, control device 420 provides a query 407 to mapping component 406 to search for devices coupled to switching device 404 that are capable of providing television programming (e.g., by searching for the stored capabilities), and mapping component 406 provides a response 409 specifying the port of port(s) 410 to which the determined device is coupled. Responsive to receiving response 409, control logic 420 automatically switches to specified port of port(s) 410. Control device 420 may also provide a control signal 411 to the determined device (e.g., electronic device(s) 402A) that causes that device to launch the appropriate content providing service and/or to initiate playback of the content using that service. Before automatically switching ports, switching device 404 may provide a notification (e.g., notification 405) to electronic device 402B for display thereby that prompts the user for input as to whether the user would like to watch the same content being watched by his friend. If the user provides a negative input, i.e., indicating that the user would not like to watch the content, switching device 404 does not perform the port switching and/or content providing service launching operations. If the user provides a positive input, i.e., indicating that the user would like to watch the associated channel, switching device 404 performs the port switching and/or content providing service launching operations.

In another example, notification 401 may be associated with a ridesharing service (e.g., "Your ride is here!"). Data structure 300 of mapping component 406 may specify that notification 401 (and/or the contents thereof) is to be displayed via electronic device 402B and/or that the notification 401 is to be forwarded to mobile device 414 (which may cause the notification to be displayed via mobile device 214). Notification 401 (and/or the contents thereof) may be provided to the electronic device (e.g., electronic device 402B) via the port of port(s) 410 to which the electronic device is coupled. For instance, control logic 420 may provide a control signal 413 that comprises the contents of notification 401. Control signal 413 may be a HDMI-CEC-based control signal. Alternatively, in an embodiment in which electronic device 402B is coupled to switching device 404 via network interface 412, control signal 413 may be provided to the electronic device via network interface 412.

Figure 5:
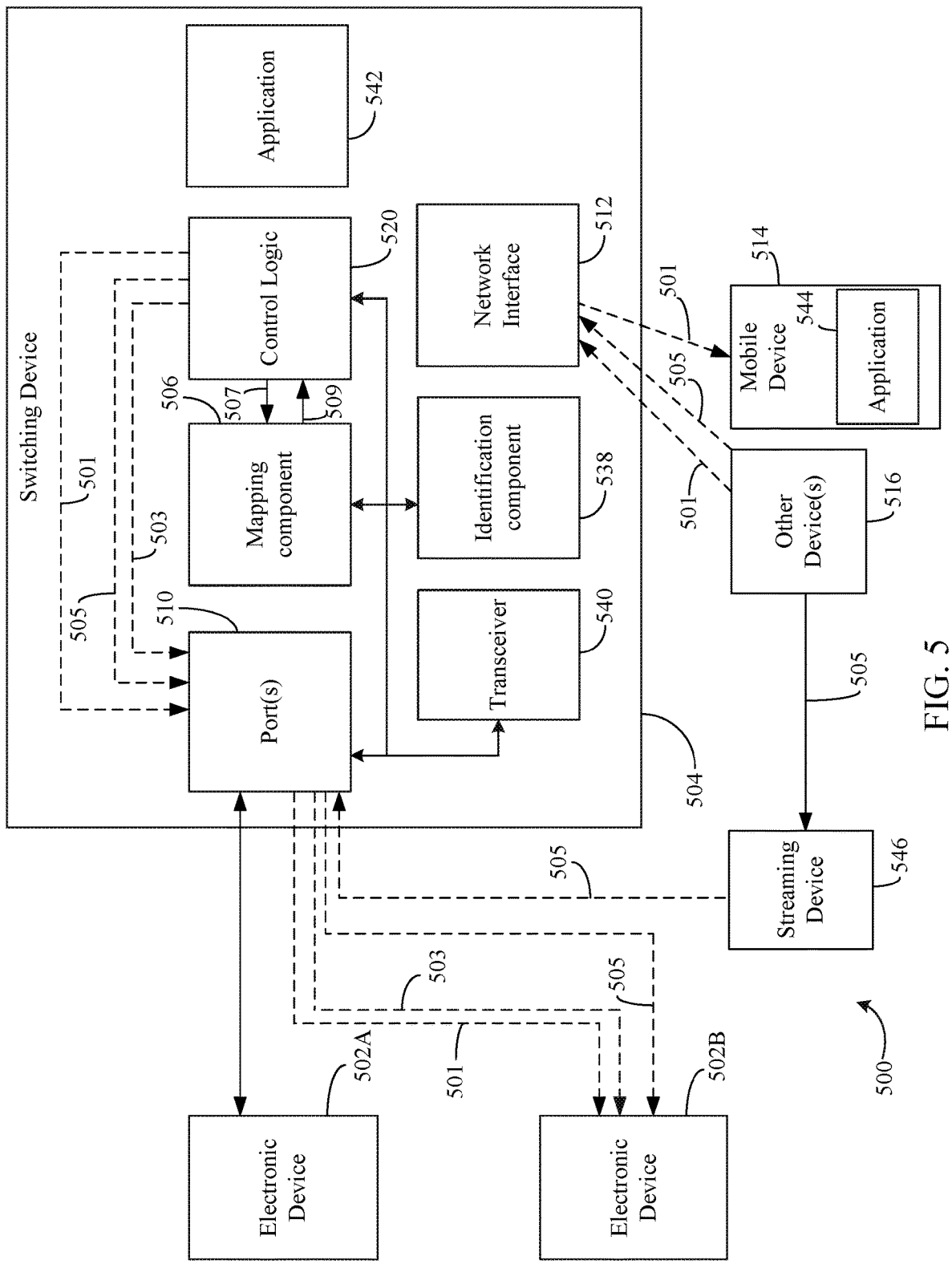
FIG. 5 is a block diagram of a system that is configured to automatically determine operation(s) that are to be performed by a switching device in accordance with yet another embodiment.

FIG. 5 is a block diagram of a system 500 for automatically performing an action based on a notification received by a switching device 504 in accordance with another embodiment. As shown in FIG. 5, system 500 includes switching device 504, electronic device 502A, electronic device 502B, a mobile device 514, and other device(s) 516. System 500, switching device 504, mobile device 514, and other device(s) 516 are examples of system 500, switching device 504, mobile device 514, and other device(s) 516, as described above with reference to FIG. 2. Electronic device 502A is an example of electronic device(s) 202A, and electronic device 502B is an example of electronic device(s) 202B, as respectively described above with reference to FIG. 2. Switching device 504 includes port(s) 510, mapping component 506, control logic 520, transceiver 540, identification component 538, and network interface 512. Port(s) 510, mapping component 506, control logic 520, transceiver 540, identification component 538, and network interface 512 are examples of port(s) 210, mapping component 206, control logic 220, transceiver 240, identification component 238, and network interface 212, as described above with reference to FIG. 2. As further shown in FIG. 5, switching device 504 may comprise a software application 542, and/or mobile device 414 may comprise a software application 544. Application 542 and application 544 are examples of application 442 and application 444, as described above with reference to FIG. 4.

In accordance with FIG. 5, a notification 501 may be received from other device(s) 216 via network interface 512. For instance, switching device 504 may receive notification 501 from a motion sensor, a camera, a smart door bell, smart light bulb, a smart thermostat, a smart locking mechanism (e.g., a door lock), etc., that indicates that a person is at the user's front door, that some activity has been detected in the user's home or that certain other device(s) 516 (e.g., camera, motion sensor, etc.) have been moved or re-located, etc. Data structure 300 of mapping component 506 may specify that notification 501 is to be displayed via electronic device 502, that notification 501 is forwarded to mobile device 514 via network interface 512 (which may cause notification 501 (and/or the contents thereof) to be displayed via mobile device 514 and/or cause application 544 to be launched on mobile device 514 (e.g., so that user can be made aware of such activity in the event he is not home)), and/or launch application 542 stored by switching device 504. Applications 542 and/or 544 may comprise a web browser application that traverses to a home security website associated with the user that displays a video and/or audio stream provided by the camera upon receiving notification 501. Applications 524 and/or 544 may also be a home security application that launches upon receiving notification 501. Application 542 may be displayed via electronic device 502B. Alternatively, the video and/or audio stream provided by camera (shown as video and/or audio stream 505) may be provided to switching device 512 via network interface 512, and control logic 520 provides video and/or audio stream 505 to electronic device 502B via the port of port(s) 510 to which electronic device 502B is coupled. In accordance with an embodiment, when viewing stream 505 via electronic device 502B, stream 505 is overlaid on top of content being played back thereby (e.g., in a picture-in-picture format). Before providing stream 505, control logic 520 may provide a notification 503 to be displayed via electronic device 502B that prompts the user for input as to whether the user would like to view stream 505 of the camera. If the user provides a negative input, i.e., indicating that the user would not like to view stream 505, switching device 504 does not provide stream 505 to electronic device 502B. If the user provides a positive input, i.e., indicating that the user would like to watch stream 505, switching device 504 provides the stream 505 to electronic device 502B. In accordance with an embodiment, the camera may be communicatively coupled to a streaming device 546 connected to a port of port(s) 510. The camera may be configured to provide stream 505 to streaming device 546. In accordance with such an embodiment, data structure 300 of mapping component 506 may further specify that switching device 504 is to switch to that port. Control device 520 may provide query 507 specifying streaming device 546 to mapping component 506, and mapping component 506 provides response 506 specifying the port of port(s) 510 to which streaming device 546 is coupled. Responsive to receiving response 509, control logic 420 automatically switches to the specified port of port(s) 510. Upon switching to the appropriate port, video and/or audio stream 505 is provided to and displayed via electronic device 502B via the port of port(s) 510.

In another example, other device(s) 516 may comprise a router, gateway, etc. In such an example, the router, gateway, etc., may detect whether a device (e.g., a mobile device) has attempted to access the network and provide a notification (e.g., notification 501) to switching device 504 indicating as such via network interface 512. Data structure 300 of mapping component 506 may specify that an appropriate action is to provide notification 501 electronic device 502B for display thereby, to forward notification 501 to mobile device 514 (which may cause notification 501 to be displayed via mobile device 514 and/or cause application 544 to be launched on mobile device 514), and/or to launch application 542 of switching device 504. In accordance with such an example, application 544 executing on mobile device 514 and/or application 542 executing on switching device 504 may comprise a web browser application that traverses to the internet protocol (IP) address corresponding to the router, gateway, etc. Before automatically launching the application 542, control logic 520 may provide a notification (e.g., notification 503) to electronic device 502B via the port of port(s) 510 to which electronic device 502B is coupled for display thereby. Alternatively, in an embodiment in which electronic device 502B is coupled to switching device 502 via network interface 512, notification 503 may be provided to electronic device 502B via network interface 512. Notification 503 prompts the user for input as to whether the user would like to traverse to the IP address. If the user provides a negative input, i.e., indicating that the user would not like to traverse to the IP address, switching device 504 does not launch application 542. If the user provides a positive input, i.e., indicating that the user would like to traverse to the IP address, switching device 504 launches application 542. In accordance with an embodiment, the router may be communicatively coupled to a device connected to a port of port(s) 510, which receives notification 503. Such a device provides notification 501 to switching device 504 via the port of port(s) 210.

Figure 6:
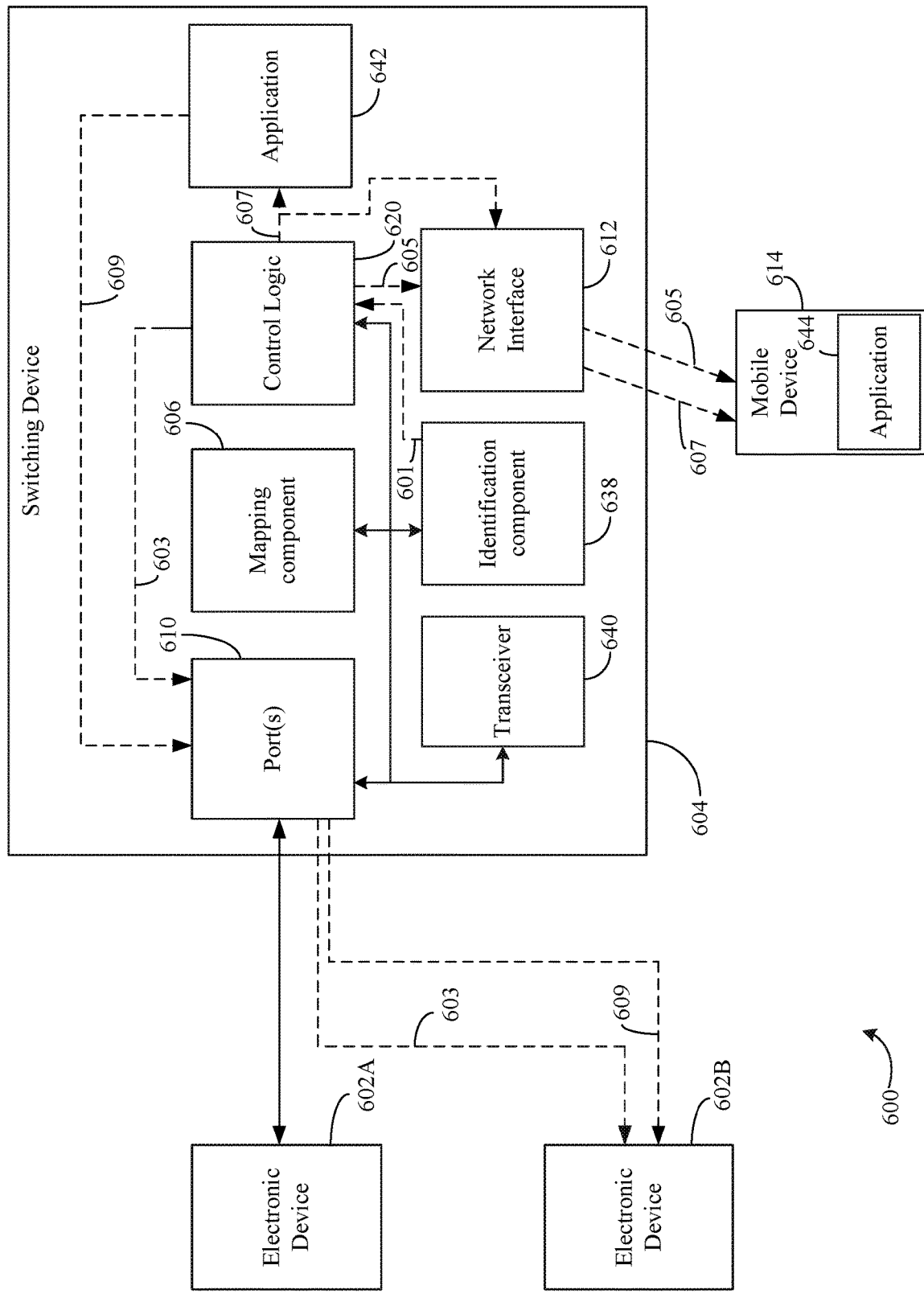
FIG. 6 is a block diagram of a system that is configured to automatically determine operation(s) that are to be performed by a switching device in accordance with yet a further embodiment.

FIG. 6 is a block diagram of a system 600 for automatically performing an action based on a notification received by a switching device 504 in accordance with a further embodiment. As shown in FIG. 6, system 600 includes switching device 604, an electronic device 602A, an electronic device 602B, and a mobile device 614. System 600, switching device 604, mobile device 614, and mobile device 614 are examples of system 200, switching device 204, and mobile device 214, as described above with reference to FIG. 2. Electronic device 602A is an example of electronic device(s) 202A, and electronic device 602B is an example of electronic device(s) 202B, as respectively described above with reference to FIG. 2. Switching device 604 includes port(s) 610, mapping component 606, control logic 620, transceiver 640, identification component 638, and network interface 612. Port(s) 610, mapping component 606, control logic 620, transceiver 640, identification component 638, and network interface 612 are examples of port(s) 210, mapping component 206, control logic 220, transceiver 240, identification component 238, and network interface 212, as described above with reference to FIG. 2. As further shown in FIG. 6, switching device 504 may comprise a software application 642, and/or mobile device 614 may comprise a software application 644. Application 642 and application 644 are examples of application 542 and application 544, as described above with reference to FIG. 5.

In accordance with FIG. 6, identification component 638 may generate a notification 601 in response to detecting an object or scene being displayed on electronic device 502B. Identification component 538 may perform image recognition on the images and/or video stream being provide to electronic device 602B in accordance with an image recognition algorithm to detect objects or scenes being displayed by electronic device 502B. Notification 601 may specify the detected object or scene and may be provided to control logic 620.

Data structure 300 of mapping component 606 may specify certain action(s) to be performed depending on the type of object or scene detected. For example, if a food item is detected (e.g., pizza), data structure 300 may specify that the user should be prompted for input as to whether the user would like to order the food item. For instance, control logic 620 may provide a prompt to electronic device 602B for display thereby. The prompt may be provided to electronic device 602B via the port of port(s) to which electronic device 602B is coupled. For instance, the prompt may be provided via a control signal 603 that is in accordance with the HDMI CEC protocol. Alternatively, in an embodiment in which electronic device 602B is coupled to switching device 604 via network interface 612, control signal 603 may be provided to electronic device 602B via network interface 604. If the user provides a positive input, i.e., indicating that the user would like order the pizza, switching device 604 may cause a browser application (e.g., application 642) executing on switching device 604 to traverse to a website of a restaurant that offers the food item, which is displayed via electronic device 602B. The website enables the user to order the food item (and/or other item(s)) and/or have the item(s) delivered to the user. In another example, switching device 604 may send a notification 605 to mobile device 614 that causes mobile device 614 to call the restaurant, causes a browser application executing thereon (e.g., application 644) to traverse to the restaurant's website, or causes a software application associated with that restaurant to be launched on mobile device 614. The software application enables the user to purchase the food item (and/or item(s)) and/or have the food item delivered to the user.

Another object or scene may be an item of clothing, a famous person (e.g., an actor, a politician, etc.), a consumer good, a particular scene or location, or any other type of object or scene. Data structure 300 may specify that the user should be prompted (e.g., via control signal 603) for input as to whether the user would like to be presented with additional information regarding the detected object(s) or perform a search query on behalf of the user. If the user provides a positive input, i.e., indicating that the user would like more information, switching device 604 may cause a browser application (e.g., application 642) executing on switching device 604 to traverse to a website enabled to provide such information, which is displayed via electronic device 602B. For instance, control logic 620 may formulate a search query 607 based on the identified object or scene and provide search query 607 to application 642. In response, application 642 may submit search query 607 to a search engine and present a search results page 609 via electronic device 602B. In another example, control logic 620 may send notification 607 to mobile device 614 via network interface 612 that causes mobile device 614 to launch a browser application executing thereon (e.g., application 644) to traverse to such a website and/or perform the search query.

In another example, switching device 204 may receive notification(s) (e.g., a news-related, weather-related, sports-related, social-media related notification, etc.) from a software application executing on mobile device 614 (e.g., application 644). Switching device 604 may perform the action(s) specified by data structure 300 for such notification(s). The action(s) may include launching an application executing on switching device 604 (e.g., application 642). Application 642 executing on switching device 604 may comprise a web browser application that traverses to an associated website (e.g., a weather-related website, a news-related website, a sports-related website) upon receiving the notification. Application 642 may also be an associated application (e.g., a weather-related software application, a sports-related software application, a news-related software application) that launches upon receiving the notification. It is noted that in certain embodiments, the notification(s) provided by mobile device 614 may specify action(s) that are to be performed by switching device 604. Accordingly, usage of data structure 300 may not be required in such a case.

It is noted that the notification(s) and action(s) described above are purely exemplary and that any type of notification may be mapped to any number and/or type of action(s). For example, data structure 300 may map action(s), such as changing the volume of electronic device 602B, powering on/off one or more of electronic device(s) 602A and 602B, sending a control signal to a digital video recorder (DVR) or a cable set-top box or a satellite set-top box that incorporates a DVR that causes the DVR to set a recording, etc., in response to receiving certain notification(s) from mobile device 614, data source(s) 418 (as described above with reference to FIG. 4), and/or other device(s) 516 (as described above with reference to FIG. 5).

Figure 7:
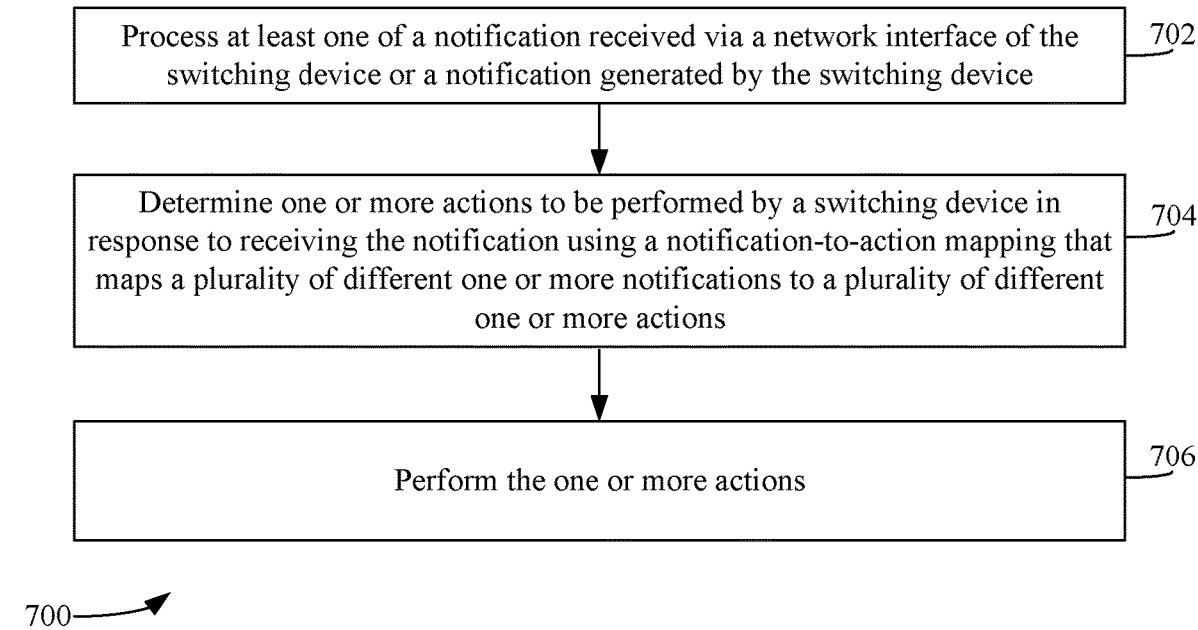
FIG. 7 depicts a flowchart of a method performed by a switching device that performs an action in response to receiving a notification in accordance with an example embodiment.

Accordingly, in embodiments, a switching device may be configured to perform action(s) based on notification(s) in many ways. For instance, FIG. 7 depicts a flowchart 700 of a method performed by a switching device that performs an action in response to receiving a notification in accordance with an example embodiment. The switching device may comprise a plurality of AV ports and a switch circuit that is operable to selectively connect any one of a plurality of source devices, each of which is connected to a corresponding one of the plurality of AV ports, to a sink device that is connected to another one of the plurality of AV ports. The method of flowchart 700 is described with continued reference to FIGS. 3-6. Other structural and operational embodiments will be apparent to persons skilled in the relevant art(s) based on the following discussion regarding flowchart 700 and systems 300, 400, 500, and 600.

Flowchart 700 begins with step 702. At step 702, at least one of a notification received via a network interface of the switching device or a notification generated by the switching device is processed. For example, with reference to FIGS. 4 and 5, switching device 404 or 505 may process notification 401 or 501 received via network interface 412 or 512, respectively, or, with reference to FIG. 6, may process notification 601 generated by identification component 638 of switching device 604.

In accordance with one or more embodiments, the notification is received via one or more data sources configured to provide one or more of news-related information, sports-related information, weather-related information, social-media related information or information associated with one or more accounts associated with a user of the switching device. For example, with reference to FIG. 4, notification 401 is received via data source(s) 418.

In accordance with one or more embodiments, the notification is received from one or more devices communicatively coupled to the switching device, the one or more devices comprising a mobile device, a smart appliance, an Internet-of-Things device, a router, or a gateway. For example, with reference to FIG. 5, notification 501 is received from other device(s) 516.

In accordance with one or more embodiments, the notification indicates that a particular object has been detected in a video stream being played back by the sink device. For example, with reference to FIG. 6, notification 601 indicates that a particular object has been detected in a video stream being provided to and/or being played back electronic device 602B.

At step 704, one or more actions to be performed by the switching device are determined in response to receiving the notification using a notification-to-action mapping that maps a plurality of different one or more notifications to a plurality of different one or more actions. For example, with reference to FIGS. 4-6, control logic 420, 520, or 620 determines action(s) to be performed by switching device 404, 504, or 604 in response to receiving notification 401, 501, or 601 using a notification-to-action mapping maintained by mapping component 406, mapping component 506, or mapping component 606, respectively.

At step 706, the action(s) are performed. For example, with reference to FIGS. 4-6, switching device 404, switching device 504, or switching device 604, respectively performs the action(s).

In accordance with one or more embodiments, the action(s) comprise launching an application on the switching device, causing an application on a mobile device communicatively coupled to the switching device via the network interface to be launched, causing the notification to be displayed on the sink device, causing the notification to be displayed on the mobile device, causing a search query to be performed, switching to a port of the plurality of AV ports to which a source device of the plurality of source devices that is configured to perform at least one of the one or more actions is coupled, or causing a source device of the plurality of source device to playback content.

For example, with reference to FIG. 4, control logic 420 launches application 442 on switching device 404 or causes application 444 on mobile device 414 to be launched. With reference to FIG. 5, control logic 520 causes notification 501 to be displayed on electronic device 502B or causes notification 501 to be displayed on mobile device 514. With reference to FIG. 6, control logic 620 causes a search query 507 to be performed by application 642. With reference to FIG. 4, control logic 420 may cause switching device 404 to switch to a port of port(s) 410 to which electronic device 402A is coupled or cause electronic device 402A to playback content.

In accordance with one or more embodiments, the switching device provides a prompt to the sink device to be displayed thereby, the prompt prompting a user to indicating whether the one or more actions are to be performed. The one or more actions are performed responsive to receiving input from the user that is indicative that the one or more actions are to be performed. For example, with reference to FIG. 5, control logic 520 of switching device 504 provides a prompt via control signal 503 to electronic device 502B via a port of port(s) 510 to which electronic device 502B is coupled. Switching device 504 performs the one or more actions responsive to the user providing a positive input that indicates that the one or more actions are to be performed.

Figure 8:
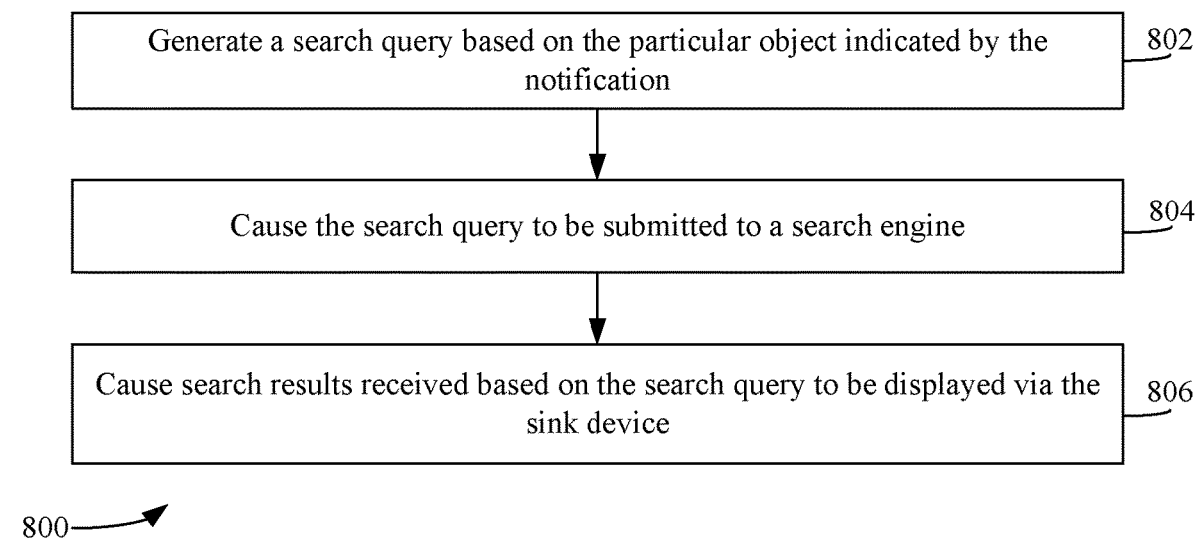
FIG. 8 depicts a flowchart of a method performed by a switching device that provides information associated with a detected object in accordance with an example embodiment.

In accordance with one or more embodiments, the user may be presented with information associated with the object detected. For instance, FIG. 8 depicts a flowchart 800 of a method performed by a switching device that provides information associated with a detected object in accordance with an example embodiment. The method of flowchart 800 is described with continued reference to FIG. 6. Other structural and operational embodiments will be apparent to persons skilled in the relevant art(s) based on the following discussion regarding flowchart 800 and system 600.

Flowchart 800 begins with step 802. At step 802, a search query is generated based on the particular object indicated by the notification. For example, with reference to FIG. 6, control logic 620 may generate a search query 607 based on the particular object indicated by notification 601.

At step 804, the search query is caused to be submitted to a search engine. For example, with reference to FIG. 6, control logic 620 provides search query 607 to application 642, which submits search query 607 to a search engine.

At step 806, search results received based on the search query are caused to be displayed via the sink device. For example, with reference to FIG. 6, application 642 provides search results 609 to electronic device 602B via a port of port(s) 610 to which electronic device 602B is coupled.

Further Example Embodiments

A device, as defined herein, is a machine or manufacture as defined by 35 U.S.C. § 101. Devices may be digital, analog or a combination thereof. Devices may include integrated circuits (ICs), one or more processors (e.g., central processing units (CPUs), microprocessors, digital signal processors (DSPs), etc.) and/or may be implemented with any semiconductor technology, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

Techniques and embodiments, including methods, described herein may be implemented in hardware (digital and/or analog) or a combination of hardware and software and/or firmware. Techniques described herein may be implemented in one or more components. Embodiments may comprise computer program products comprising logic (e.g., in the form of program code or instructions as well as firmware) stored on any computer useable storage medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable storage media include, but are not limited to, a hard disk, a removable magnetic disk, a removable optical disk, flash memory cards, digital video disks, random access memories (RAMs), read only memories (ROM), and the like. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (microelectromechanical systems) storage, nanotechnology-based storage devices, as well as other media such as flash memory cards, digital video discs, RAM devices, ROM devices, and the like. Such computer-readable storage media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

Computer readable storage media are distinguished from and non-overlapping with communication media (do not include communication media or modulated data signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wired media as well as wireless media such as acoustic, RF, infrared and other wireless media. Example embodiments are also directed to such communication media.

The automatic operation/action determination embodiments and/or any further systems, sub-systems, and/or components disclosed herein may be implemented in hardware (e.g., hardware logic/electrical circuitry), or any combination of hardware with software (computer program code configured to be executed in one or more processors or processing devices) and/or firmware.

Figure 9:
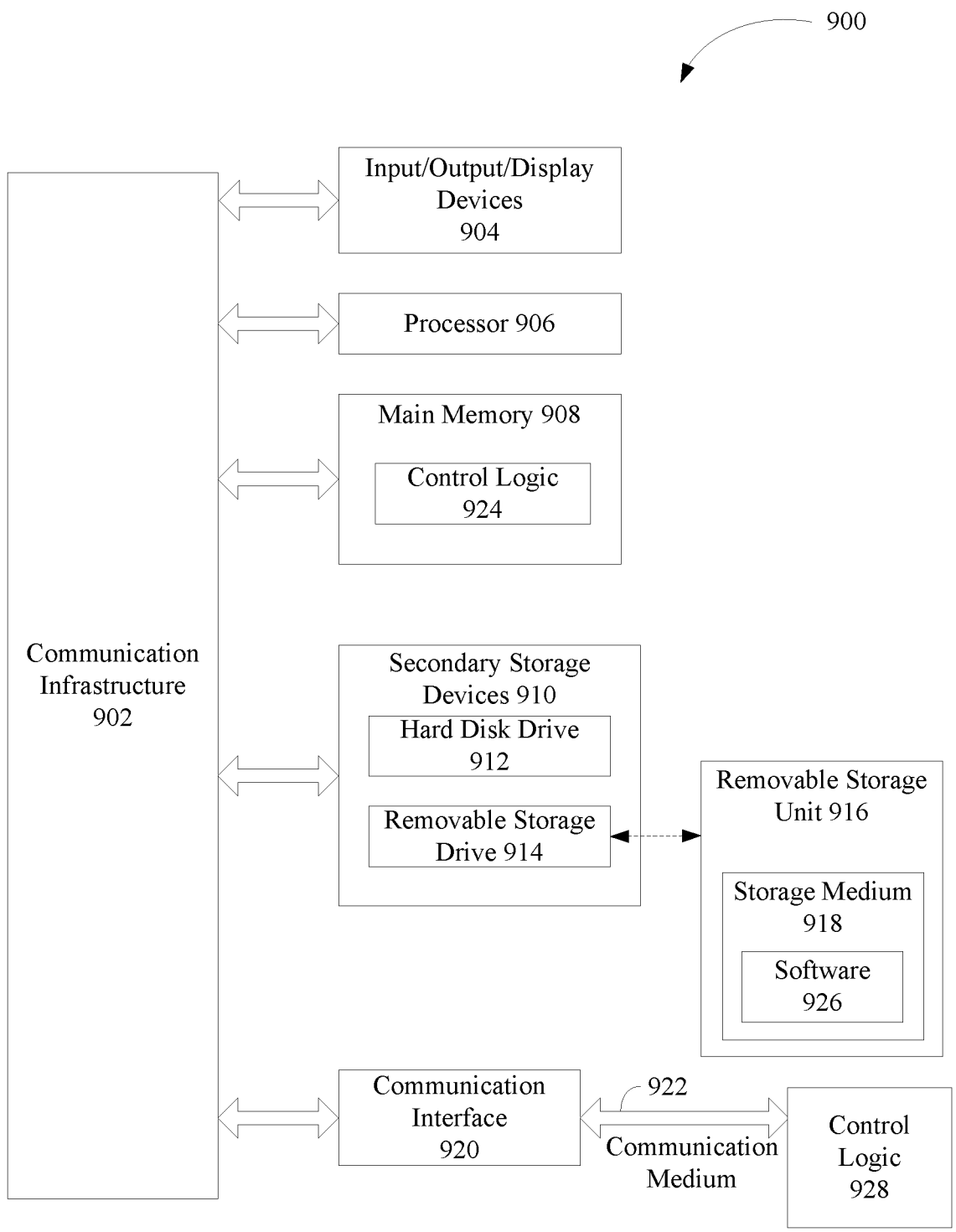
FIG. 9 is a block diagram of a computer system in accordance with an embodiment.

The embodiments described herein, including systems, methods/processes, and/or apparatuses, may be implemented using well known processing devices, servers, electronic devices (e.g., consumer electronic devices) and/or, computers, such as a computer 900 shown in FIG. 9. It should be noted that computer 900 may represent communication devices, processing devices, servers, and/or traditional computers in one or more embodiments. For example, electronic devices 102A-102D, switching device 104, mobile device 114, control device 106, other device(s) 116, and data source(s) 118 (as described above in reference to FIG. 1), switching device 204, electronic device(s) 202A-202B, other device(s) 216, mobile device 214, and/or data source(s) 218 (as described above in reference to FIG. 2), switching device 404, electronic devices 402A-402B, mobile device 414, and/or data source(s) 418 (as described above in reference to FIG. 4), switching device 504, electronic devices 502A-502B, mobile device 514, and/or other device(s) 516, and streaming device 546 (as described above in reference to FIG. 5), and switching device 604, electronic devices 602A-602B, and mobile device 614 (as described above in reference to FIG. 6), any of the sub-systems, components or sub-components respectively contained therein, and/or flowcharts 700 and 800 may be implemented using one or more computers 900.

Computer 900 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 900 may be any type of computer, including a desktop computer, a server, etc.

Computer 900 includes one or more processors (also called central processing units, or CPUs), such as a processor 906. Processor 906 is connected to a communication infrastructure 902, such as a communication bus. In some embodiments, processor 906 can simultaneously operate multiple computing threads.

Computer 900 also includes a primary or main memory 908, such as random access memory (RAM). Main memory 908 has stored therein control logic 924 (computer software), and data.

Computer 900 also includes one or more secondary storage devices 910. Secondary storage devices 910 include, for example, a hard disk drive 912 and/or a removable storage device or drive 914, as well as other types of storage devices, such as memory cards and memory sticks. For instance, computer 900 may include an industry standard interface, such a universal serial bus (USB) interface for interfacing with devices such as a memory stick. Removable storage drive 914 represents a floppy disk drive, a magnetic tape drive, a compact disk drive, an optical storage device, tape backup, etc.

Removable storage drive 914 interacts with a removable storage unit 916. Removable storage unit 916 includes a computer useable or readable storage medium 918 having stored therein computer software 926 (control logic) and/or data. Removable storage unit 916 represents a floppy disk, magnetic tape, compact disk, DVD, optical storage disk, or any other computer data storage device. Removable storage drive 914 reads from and/or writes to removable storage unit 916 in a well-known manner.

Computer 900 also includes input/output/display devices 904, such as touchscreens, LED and LCD displays, monitors, keyboards, pointing devices, etc.

Computer 900 further includes a communication or network interface 918. Communication interface 920 enables computer 900 to communicate with remote devices. For example, communication interface 920 allows computer 900 to communicate over communication networks or mediums 922 (representing a form of a computer useable or readable medium), such as LANs, WANs, the Internet, etc. Network interface 920 may interface with remote sites or networks via wired or wireless connections.

Control logic 928 may be transmitted to and from computer 900 via the communication medium 922.

Any apparatus or manufacture comprising a computer useable or readable medium having control logic (software) stored therein is referred to herein as a computer program product or program storage device. This includes, but is not limited to, computer 900, main memory 908, secondary storage devices 910, and removable storage unit 916. Such computer program products, having control logic stored therein that, when executed by one or more data processing devices, cause such data processing devices to operate as described herein, represent embodiments of the invention.

Any apparatus or manufacture comprising a computer useable or readable medium having control logic (software) stored therein is referred to herein as a computer program product or program storage device. This includes, but is not limited to, a computer, computer main memory, secondary storage devices, and removable storage units. Such computer program products, having control logic stored therein that, when executed by one or more data processing devices, cause such data processing devices to operate as described herein, represent embodiments of the inventive techniques described herein.

Conclusion

While various embodiments have been described above, it should be understood that they have been presented by way of example only, and not limitation. It will be apparent to persons skilled in the relevant art(s) that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A switching device, comprising:
a plurality of audio/video (AV) ports;
a wireless interface; and
a switch circuit that is operable to selectively connect any one of a plurality of external devices, each of which is connected to a corresponding one of the plurality of AV ports, the switching device being configured to:
process at least a notification received via the wireless interface, the notification indicating a communication between a first device and the switching device;
determine at least a source of content to be displayed on the switching device based on processing the notification;
determine one or more actions to be performed by the switching device based on the notification using a notification-to-action mapping that maps a plurality of different one or more notifications to a plurality of different one or more actions; and
perform the one or more actions, the one or more actions causing the determined content from the determined source to be displayed via the switching device.

2. The switching device of claim 1, wherein the wireless interface is an infrared interface.

3. The switching device of claim 1, wherein the wireless interface is a radio frequency interface.

4. The switching device of claim 1, wherein the radio frequency interface is one of a Wi-Fi or a Bluetooth interface.

5. The switching device of claim 1, wherein the switching device is further configured to receive a voice command.

6. The switching device of claim 5, wherein the voice command comprises a command for the switching device to switch from one AV port to another AV port as the source of content.

7. The switching device of claim 1, wherein the plurality of external devices comprises at least one of a set-top box, a streaming device, a Blu-ray player, or a video gaming console.

8. The switching device of claim 1, wherein the source of content is an external device that further receives content from the Internet.

9. The switching device of claim 8, wherein the external device that receives content from the Internet comprises at least one of a set-top box, a streaming device, a Blu-ray player, or a video gaming console.

10. A method performed by a switching device comprising a plurality of audio/video (AV) ports, a wireless interface, and a switch circuit that is operable to selectively connect any one of a plurality of external devices, each of which is connected to a corresponding one of the plurality of AV ports, the method comprising:
processing at least a notification received via the wireless interface, the notification indicating a communication between a first device and the switching device;
determining at least a source of content to be displayed on the switching device based on processing the notification;
determining one or more actions to be performed by the switching device based on the notification using a notification-to-action mapping that maps a plurality of different one or more notifications to a plurality of different one or more actions; and
performing the one or more actions, the one or more actions causing the determined content from the determined source to be displayed via the switching device.

11. The method of claim 10, wherein the wireless interface is an infrared interface.

12. The method of claim 10, wherein the wireless interface is a radio frequency interface.

13. The method of claim 10, wherein the radio frequency interface is one of a Wi-Fi or a Bluetooth interface.

14. The method of claim 10, wherein the switching device is further configured to receive a voice command.

15. The method of claim 14, wherein the voice command comprises a command for the switching device to switch from one AV port to another AV port as the source of content.

16. The method of claim 10, wherein the plurality of external devices comprises at least one of a set-top box, a streaming device, a Blu-ray player, or a video gaming console.

17. The method of claim 10, wherein the source of content is an external device that further receives content from the Internet.

18. The method of claim 17, wherein the external device that receives content from the Internet comprises at least one of a set-top box, a streaming device, a Blu-ray player, or a video gaming console.

19. A non-transitory computer-readable storage medium having program instructions recorded thereon that, when executed by a processor of a switching device, perform a method, the method comprising:
processing at least a notification received via a wireless interface of the switching device, the notification indicating a communication between a first device and the switching device;
determining at least a source of content to be displayed on the switching device based on processing the notification;
determining one or more actions to be performed by the switching device based on the notification using a notification-to-action mapping that maps a plurality of different one or more notifications to a plurality of different one or more actions; and
performing the one or more actions, the one or more actions causing the determined content from the determined source to be displayed via the switching device.

20. The non-transitory computer-readable storage medium of claim 19, wherein the wireless interface is an infrared interface.

* * * * *